Oct. 29, 1929.　　C. N. MONTEITH ET AL　　1,733,973
AIRPLANE EMERGENCY FLOTATION GEAR
Filed Sept. 8, 1927　　4 Sheets-Sheet 1
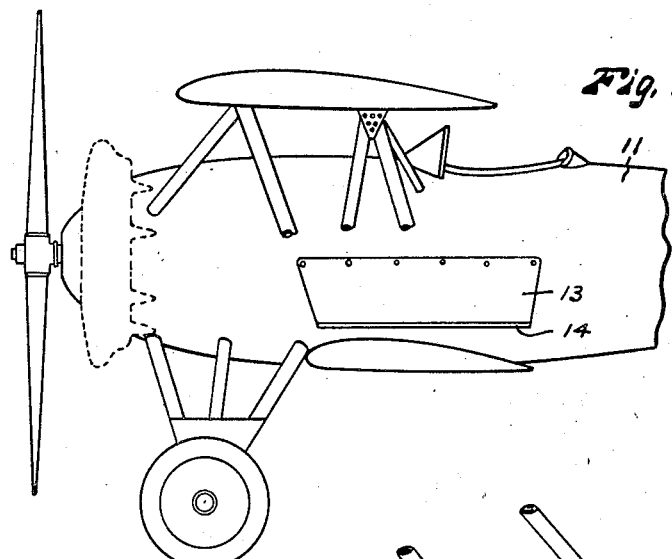
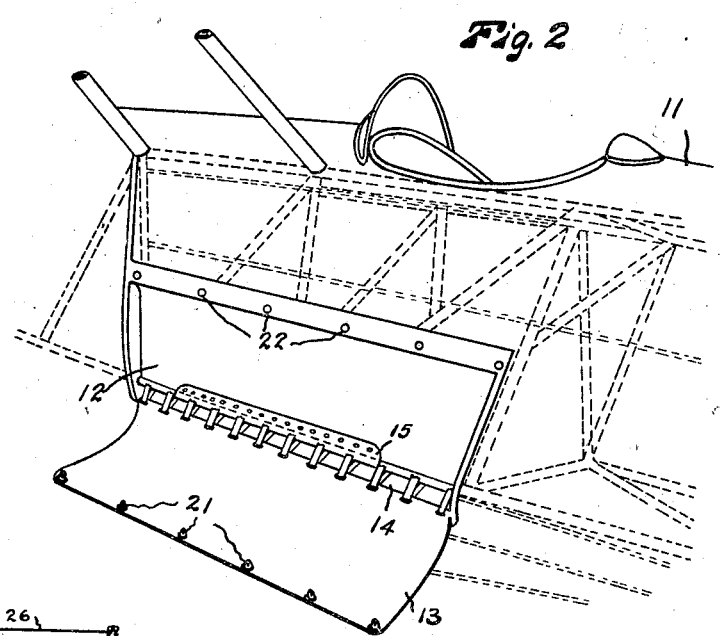
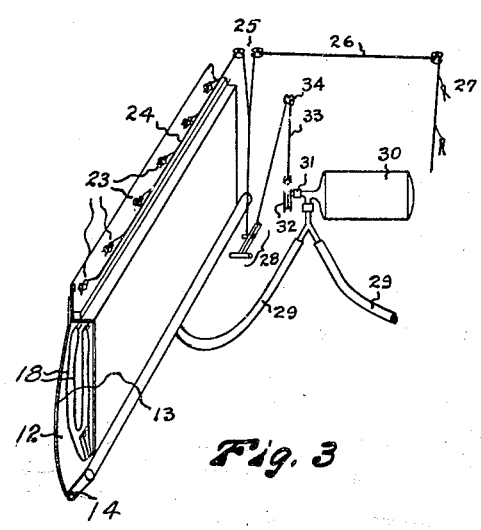
INVENTORS
Charles Norton Monteith
Frederick Gray Arnold
Robert James Minshall
BY
ATTORNEY

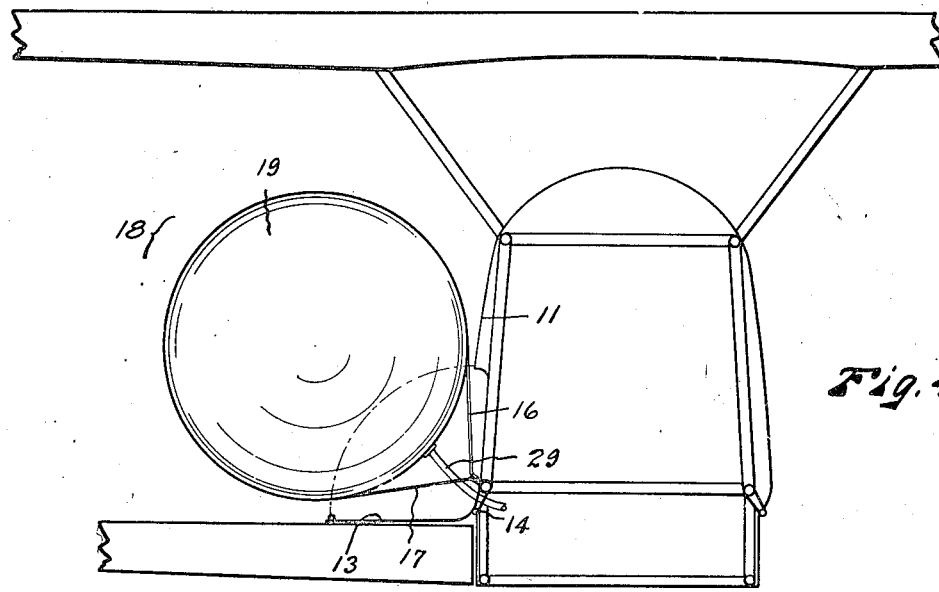
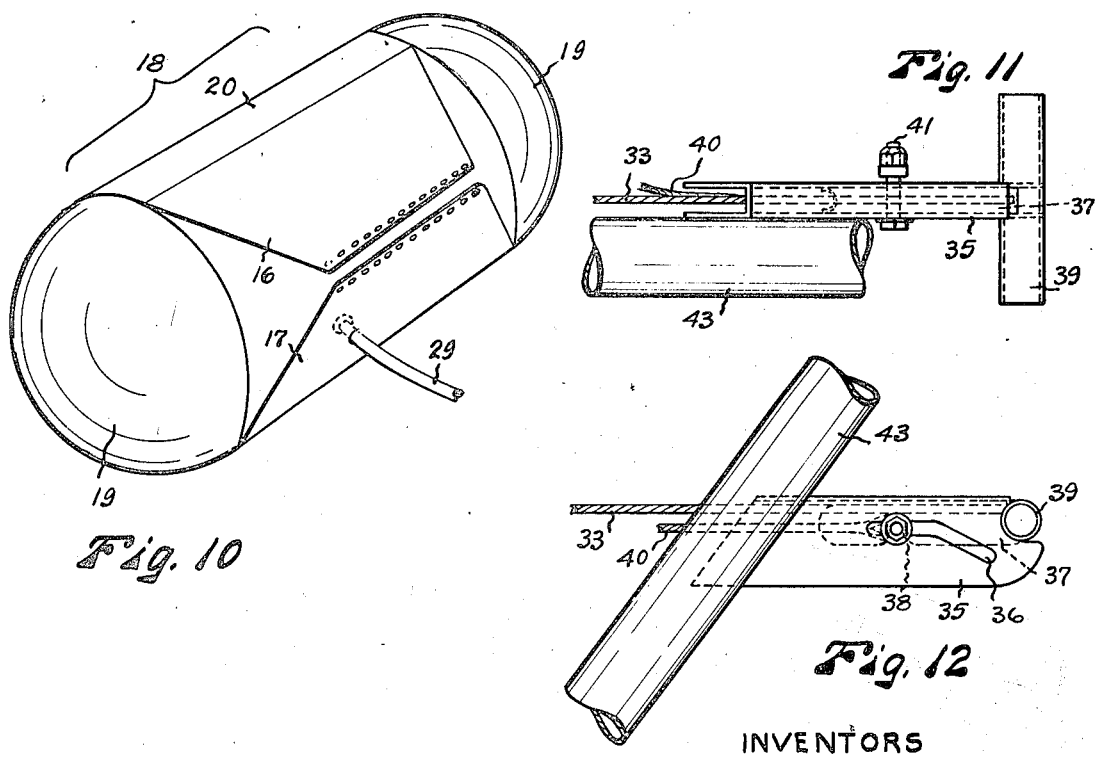

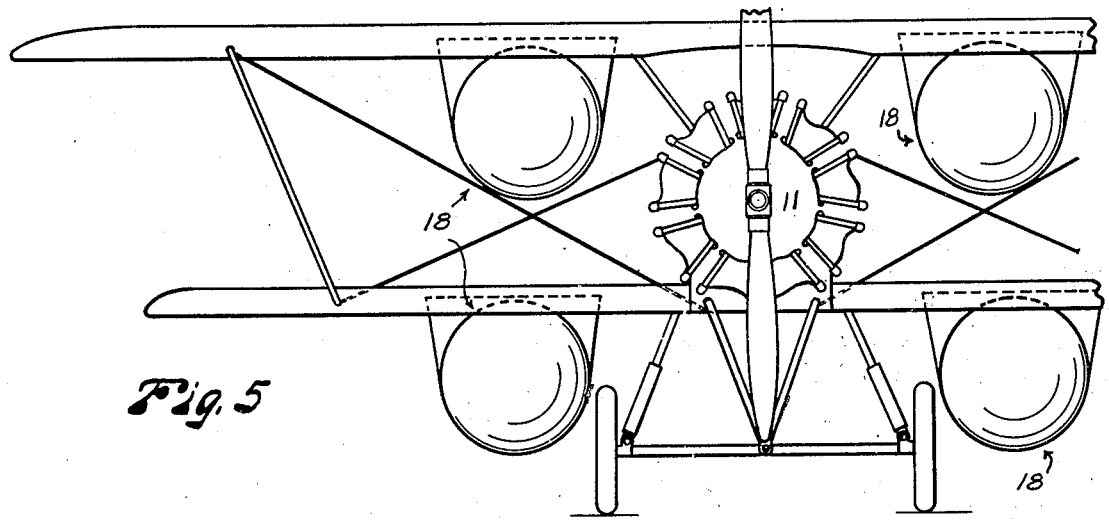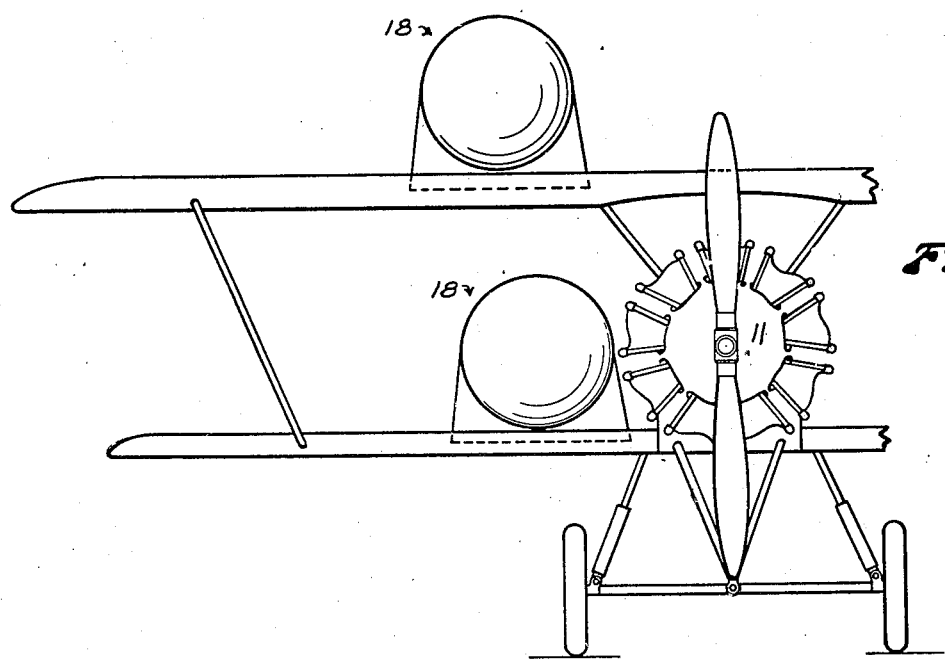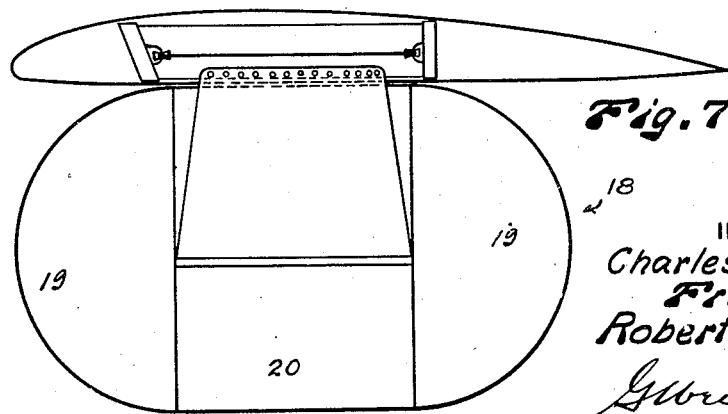

Oct. 29, 1929.　　　C. N. MONTEITH ET AL　　　1,733,973
AIRPLANE EMERGENCY FLOTATION GEAR
Filed Sept. 8, 1927　　　4 Sheets-Sheet 4
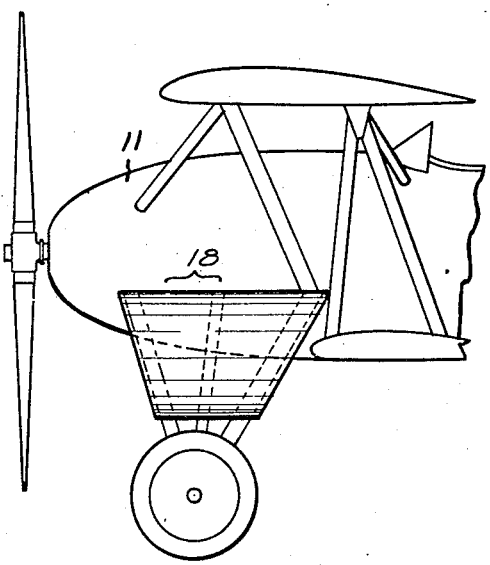
Fig. 8
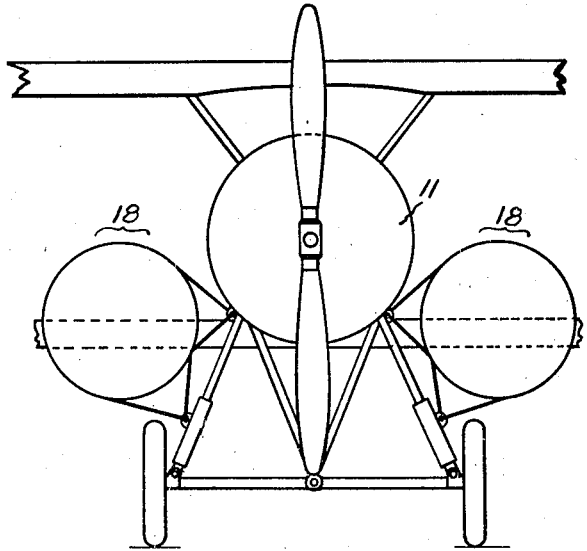
Fig. 9
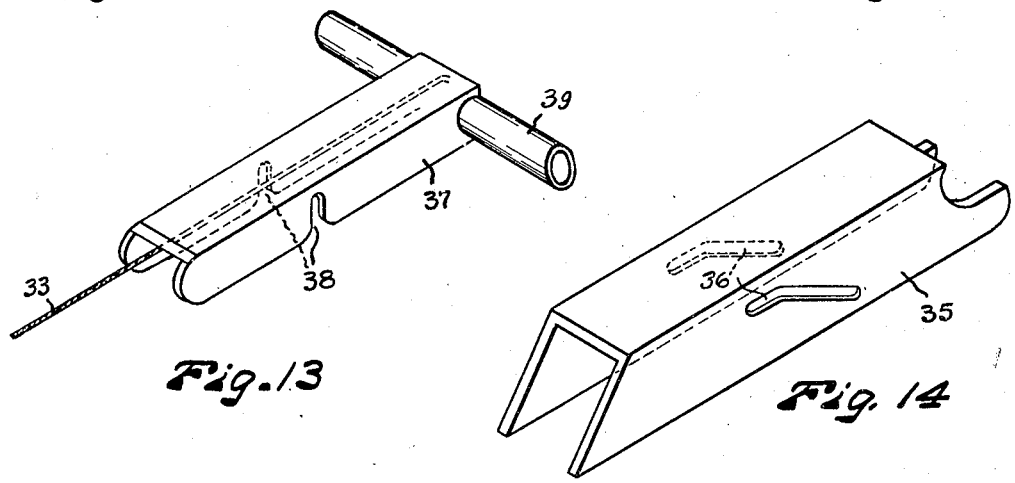
Fig. 13
Fig. 14
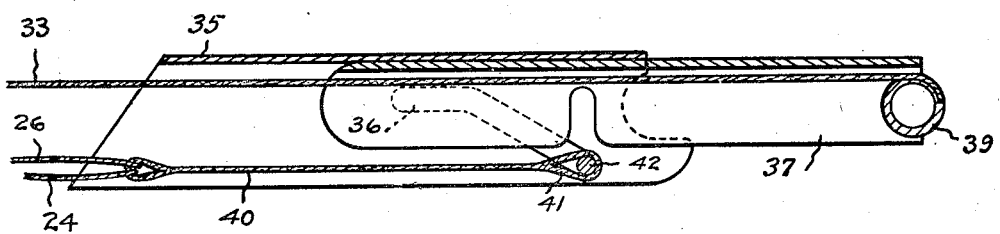
Fig. 15
INVENTORS
Charles Norton Monteith
Frederick Gray Arnold
Robert James Minshall
BY
　　　　　　　ATTORNEY Patented Oct. 29, 1929

1,733,973

UNITED STATES PATENT OFFICE

CHARLES NORTON MONTEITH, FREDERICK GREY ARNOLD, AND ROBERT JAMES MIN-SHALL, OF SEATTLE, WASHINGTON, ASSIGNORS TO BOEING AIRPLANE COMPANY, A CORPORATION OF WASHINGTON

AIRPLANE EMERGENCY FLOTATION GEAR

Application filed September 8, 1927. Serial No. 218,300.

Our invention relates to the art of an emergency flotation gear for an airplane equipped with land alighting gear operating over water. More particularly, our invention relates to providing an airplane having an emergency flotation gear built within the airplane structure, a rigid cover constituting a section of the airplane exterior shell disposed over said gear, and releasing means which opens said cover and simultaneously or momentarily thereafter opens the container of compressed fluid which inflates the flotation bags normally in collapsed condition and positively insures the opening of said cover upon the occasion of a forced landing in water.

Heretofore it has been suggested to mount a board to the under side of the lower wing on each side of the fuselage extending both fore and aft of the wing, and to secure to this board a collapsible bag. Within the airplane compressed air was provided capable of being released in an emergency to fill said bags. Serious objection obtains to such emergency gear in that it is exterior of the structure and creates greatly increased air resistance for the airplane. Such increase detracts to a great degree from the performance of the airplane,—the performance of which being critically dependent upon the avoidance of all unnecessary resistance.

In providing an airplane with emergency flotation gears there are two important considerations. First, such emergency equipment should be designed to keep the airplane afloat in such a manner as to provide a life-saving raft for the personnel, and, second, to keep as much of the airplane above the water as possible, so that its detection by searching parties will be facilitated.

A further condition to be satisfied is that the distance of travel of the releasing mechanism for the compartment cover, must be relatively shorter than the releasing means for the fluid container.

A primary object of our invention is to satisfy all these conditions; also to provide an airplane with an emergency flotation gear which is housed within the stream line form of the airplane structure, either in the fuselage or in either or both wings, or in the landing gear.

A further primary object of our invention is to provide a simple and efficient releasing mechanism for said flotation gear means whereby the release of the gear means and the inflation of the said gear means are accomplished by a single operation on the part of the pilot.

Moreover, a primary object of our invention is to provide a flotation bag for such an emergency landing gear which will have hemispheric ends and a cylindrical mid-section, the length of said mid-section being approximately three-fourths of the diameter of the bag. Thereby this form of a flotation bag gives the maximum displacement with the minimum weight of material involved and at the same time provides a form which may be suitably anchored.

The above mentioned general objects of our invention together with others inherent in the same, are attained by the mechanism illustrated in the following drawings, the same being a preferred exemplary form of embodiment of our invention, throughout which drawings like reference numerals indicate like parts:

Figure 1, is a view in side elevation of the forward part of an airplane embodying our invention;

Fig. 2 is a view in perspective of a part of an airplane fuselage showing the emergency flotation gear compartment;

Fig. 3 is a detached view of the compartment, inflation and releasing means;

Fig. 4 is an enlarged end view of the compartment and the flotation bag showing the same in operative position;

Fig. 5 is a fragmentary view in front elevation of an airplane having the flotation gear compartment embodying our invention located in the underside of the wings;

Fig. 6 is a view similar to Fig. 5 with the compartment located in the upper side of the wings;

Fig. 7 is a view in side elevation with the compartment and flotation bag on the underside of the wing in operative position;

Fig. 8 is a view in side elevation of an emergency flotation gear housed in the landing gear;

Fig. 9 is a view in front elevation of an emergency flotation gear housed in the landing gear and the flotation bags in operative position;

Fig. 10 is a view in perspective of the flotation bag means;

Fig. 11 is an enlarged top view of the releasing means mounted upon a fuselage bracing member;

Fig. 12 is an enlarged side view of said means and bracing member;

Fig. 13 is an enlarged view in perspective of said releasing means;

Fig. 14 is an enlarged view in perspective of the fixed member of the releasing means; and Fig. 15 is a view in longitudinal section of said releasing means with the parts moved into full releasing position.

In each side of an aeroplane fuselage 11, an emergency flotation gear housing or compartment 12 is provided, closable by a releasable cover 13, hingedly mounted by hinge 14.

By cover as used herein is meant a rigid metallic lid, preferably of aluminum and of the form corresponding to the particular section of the airplane structure obtaining over the compartment whether the same be in the sides of the fuselage or in the wing structure and if the compartment is located in the landing gear, the said cover takes the form which provides the proper stream line.

In the housing 12 a retaining rib 14 a is secured adjacent to the hinge 14; to this rib is secured by suitable lacing anchoring flaps 16 and 17 of flotation bag 18, said flotation bag being preferably provided with hemispherical ends 19 and a cylindrical mid-section 20, said mid-section being in length, approximately ¾ of the diameter of the bag.

The cover 13 is releasably secured in closed position along the upper edge by means of eyelets 21, which extend through openings 22, and through said eyelets, pins 23 extend when the cover is in closed position. These pins are all secured to a cable 24, which extends over suitable pulley means 25, and is joined with a similar cable 26 securing similar pins 27, in the emergency flotation gear housing or compartment on the opposite side of the fuselage. These cables are secured to a common releasing means 28. A rod may obviously be substituted for that portion of the cable 24 which extends across the length of the cover 13.

The flotation bag 18 is provided with a high pressure flexible hose 29, which is connected to a standard compressed fluid container 30, which comes equipped with a well known releasing valve 31 the ordinary handwheel of which we replace with a pulley 32. Cable 33 is operatively disposed over pulley means 34 and is secured to the releasing means 28. This releasing means is therefore disposed to control by its operation both the opening of cover 13 and the releasing of the fluid pressure in the container 30.

The structure of this common releasing means 28 is as follows:

A member 35 preferably of channel form is provided with an angular slot 36. This member may be fixedly mounted to a fuselage bracing member 43 or any other part of the airplane structure conveniently reached from the cockpit. Within this fixed member 35 is slidably disposed a releasing or movable member 37, likewise preferably of channel form. In movable member 37 a cable-securing-pin-retainer vertical slot 38 is formed. This sliding member 37 has integrally formed therewith a handle 39. Cable 33 (that is cable controlling the fluid container valve 31) may be fixedly secured to this handle 39. Cables 25 and 26 are secured to a common cable member 40, which has an eye 41 in which a pin 42 is fixably secured to form a cable securing pin means.

The mode of operation of this releasing means is as follows: In Fig. 12 the releasing means is shown with the emergency flotation gear in closed, inoperative position. In this position the pin 42 passes through slot 38 thence through slot 36; and when the pin is in this "closed" position it is in the forward (upper) end of angular slot 36. When it is desired to release the emergency flotation gear, that is to put it into operative position, the operator grips handle 39 of sliding member 37 and pulls it backward, thereby causing pin 42 to contact the wall of slot 38, which causes pin 42 to move backward along slot 36 together with sliding member 37, pulling into released position pins 23 and permitting cover 13 to open. The length and shape of slot 36 is such as to permit the necessary distance of travel of cables 25 and 26 to release said pins. As soon as such releasing of pins 23 is accomplished, pin 42 is moved or is dropped to the rearward (lower) end of slot 36, and when in this position is below the slot 38 or sliding member 37, so that the continued withdrawal of sliding member 37 causes slot 38 to pass over pin 42. When the pin reaches this position there is no further motion on the part of cable 40 and consequently no further motion on part of cables 24 and 26 and the pin 42 is held in said position by the walls of slot 36 and the lower edge of the flanges of member 37. The stopping of the travel of this cable is necessary to prevent jamming the mechanism by drawing the pins 23 over the pulley means 25. The continued withdrawing of sliding member 37 effects the opening of valve 31, thereby releasing the fluid in container 30, which immediately inflates the flotation bags 18. The inflation of these bags insures positively the opening of cover 13.

Our emergency gear means is adapted to locate the center of buoyancy of the flotation bags as close to the center of weight of the complete airplane as possible, i. e. as close as the airplane structure permits.

Figs. 5, 6, 7, 8 and 9 illustrate the possible positions of locating the emergency flotation gear.

Thus, our invention provides air emergency flotation gear disposed within the stream lines of the airplane structure so that it does not interfere with its normal areodynamic performance.

Obviously, change may be made in the arrangement of the parts of our invention without departing from the purpose thereof, the above setting forth only a preferred form of embodiment.

We claim—

1. In an airplane emergency flotation gear having an emergency flotation gear compartment disposed within the stream lines of the fuselage, the combination of a releasable rigid cover for said compartment, a flotation bag anchored in said compartment, a compressed fluid container, compressed fluid container connector means joining said container and said bag and a releasable means common to both said cover and said container.

2. In an airplane emergency flotation gear, a releasing means embodying a fixed and a slidable member, a cable secured to said slidable member, a cable securing means movably held by said fixed member, said means being engageable by said slidable member, whereby said cable securing means may be moved a predetermined distance less than the travel distance of the slidable member and held in a fixed position.

3. In an airplane emergency flotation gear, a releasing means embodying two relatively movable channel members, one disposed in the other, one of said members having an angularly formed closed slot and the other an open slot, a cable secured to the latter member, a cable securing means movably held in said closed slot, said means being engageable by said open slotted member whereby said cable means may be moved to the end of said closed slot and there held after the open slot has become disengaged from said cable securing means.

In witness whereof, we hereunto subscribe our names this 13th day of March 1928.

CHARLES NORTON MONTEITH.
FREDERICK GREY ARNOLD.
ROBERT JAMES MINSHALL.